(12) United States Patent
Boriack (10) Patent No.: US 6,179,315 B1
(45) Date of Patent: Jan. 30, 2001

(54) STEERABLE MACHINERY TRAILER (76) Inventor: Cale N. Boriack, Rte. 2, Box 235A, Giddings, TX (US) 78942

( * ) Notice: Under 35 U.S.C. 154(b), the term of this patent shall be extended for 0 days.

(21) Appl. No.: 09/118,522

(22) Filed: Jul. 17, 1998

(51) Int. Cl.[7] ................................................. B62D 12/00
(52) U.S. Cl. .......................... 280/419; 180/418; 56/15.4; 56/15.5; 172/280
(58) Field of Search .................................... 280/419, 426; 56/14.9, 15.4, 15.5, 15.6; 180/408, 411, 412, 414, 416, 418; 172/280, 324, 446

(56) References Cited

U.S. PATENT DOCUMENTS

| | | | |
|---|---|---|---|
| 2,316,397 | * 4/1943 | Briscoe . | |
| 3,212,793 | * 10/1965 | Pietroroia . | |
| 3,832,837 | * 9/1974 | Burkhart et al. | 56/218 |
| 4,166,352 | 9/1979 | Knusting | 56/366 |
| 4,685,282 | * 8/1987 | Allen | 56/377 |
| 4,977,734 | 12/1990 | Rowe et al. | 56/15.9 |
| 4,979,359 | * 12/1990 | Inskeep | 56/14.9 |
| 5,025,616 | 6/1991 | Moss | 56/14.9 |
| 5,231,829 | 8/1993 | Tonutti | 56/377 |
| 5,404,702 | 4/1995 | Lewis | 56/365 |
| 5,412,929 | 5/1995 | Urbain et al. | 56/15.4 |
| 5,544,475 | * 8/1996 | Skibo | 56/15.5 |

* cited by examiner

Primary Examiner—Brain L. Johnson
Assistant Examiner—Avraham H. Lerner
(74) Attorney, Agent, or Firm—Derek R. VanGilder

(57) ABSTRACT

A steerable machinery trailer (1) has a chassis (2, 33, 35, 36) intermediate a pivotal towing attachment (26, 29, 30, 46) and trailer wheels (3) proximate a rear portion of the chassis. The trailer wheels have pivotal attachment to the trailer and are pivotal for steering with a steering shaft (4) that is length-controllable intermediate rigid positioning on the chassis and a steering arm (6) attached to a steering rod (7) that is connected to a pivotal attachment of the trailer wheels to the chassis. Separately and optionally from being pivotal on the pivotal towing attachment by wheel-following of the trailer wheels, the chassis is pivotal on the pivotal towing attachment with a positioning shaft (8) that is length controllable intermediate rigid positioning on the chassis and a rigid lateral attachment (5, 9) to the towing vehicle. Length changes of the steering shaft steer the trailer wheels to guide the rear portion of the trailer from-side-to-side for selective turn-positioning of the trailer wheels. Length changes of the positioning shaft position the trailer laterally from-side-to-side for selectively side-towing of the trailer. Length changes of the steering shaft and the positioning shaft are controllable from a remote position with hydraulic-cylinder motors (39), electrical motors (41) and/or mechanical linkages.

24 Claims, 10 Drawing Sheets

STEERABLE MACHINERY TRAILER

BACKGROUND OF THE INVENTION

1. Field of the Invention.

This invention relates to steering of machinery trailers and dollies having wheels that are relatively far behind wheels of a towing vehicle.

2. Relation To Prior Art.

Wheels of machinery trailers that are relatively far behind wheels of a towing vehicle take shortcuts instead of following behind or where desired on turns. Typical are wheels of tandem rake dollies that bypass hay on turns, highway-trailer wheels that run over curbs and industrial dollies that hit corner stacks and structures when their wheels take shorter distances than those of towing vehicles such as various types of tractors and trucks.

There are known trailer-steering means, but none that allow turn-positioning with controllable motors in a manner taught by this invention.

Examples of different but related devices for steering trailing vehicles are described in the following patent documents. U.S. Pat. No. 5,412,929, issued to Urbain et al, described a tandem implement hitch having a hydraulic cylinder expandable between pivotal arms of wheel-turning rods. U.S. Pat. No. 5,404,702, issued to Lewis, described a windrow apparatus for guiding hay into a hay bailer from opposite sides. U.S. Pat. No. 4,166,352, issued to Knusting, described a hay-making machine that was adjustable to land irregularities but not to turns. U.S. Pat. No. 5,231,829, issued to Tonutti, described a rake trolley with width adjustment but not wheel-following turn adjustment. U.S. Pat. No. 5,025,616, issued to Moss, described a side arm for towing a second rake beside and behind a first rake towed by a tractor. U.S. Pat. No. 4,977,734, issued to Rowe et al, described a hydraulically foldable hay rake.

Problems with trailing of wheels of agricultural and industrial trailers and dollies continue to exist.

SUMMARY OF THE INVENTION

In light of these problems, objects of patentable novelty and utility taught by this invention are to provide a steerable machinery trailer which:

Provides selective steering of rear wheels of a trailer from a driver position of a vehicle towing the trailer; and Provides selectively lateral following of wheels of a trailer behind either side of a towing vehicle.

This invention accomplishes these and other objectives with a steerable machinery trailer having a chassis intermediate a pivotal towing attachment and trailer wheels proximate a rear portion of the chassis. The trailer wheels have pivotal attachment to the trailer and are pivotal for steering with a steering shaft that is length-controllable intermediate rigid positioning on the chassis and a steering arm attached to a steering rod that is connected to a pivotal attachment of the trailer wheels to the chassis. Separately and optionally from being pivotal on the pivotal towing attachment by wheel-following of the trailer wheels, the chassis is pivotal on the pivotal towing attachment with a positioning shaft that is length controllable intermediate rigid positioning on the chassis and a rigid lateral attachment to the towing vehicle. Length changes of the steering shaft steer the trailer wheels to guide the rear portion of the trailer from-side-to-side for selective turn-positioning of the trailer wheels. Length changes of the positioning shaft position the trailer laterally from-side-to-side for selectively side-towing of the trailer. Length changes of the steering shaft and the positioning shaft are controllable from a remote position with fluid motors, electrical motors and/or mechanical linkages,

BRIEF DESCRIPTION OF DRAWINGS

This invention is described by appended claims in relation to description of a preferred embodiment with reference to the following drawings which are described briefly as follows:

DESCRIPTION OF PREFERRED EMBODIMENT

Terms used to describe features of this invention are listed below with numbering in the order of their initial use with reference to the drawings. These terms and numbers assigned to them designate the same features wherever used throughout this description.

1. Steerable machinery trailer
2. Single-rod chassis
3. Trailer wheels
4. Steering shaft
5. First chassis position
6. Steering arm
7. Steering rod
8. Positioning shaft
9. Second chassis position
10. Positioning arm
11. Tow pin
12. Tractor
13. Tow sleeve -continued 14. Steering sleeve
15. Rigid-axle extensions
16. Pivotal axle beam
17. Pivotal-axle extensions
18. Rigid axle beam
19. Axle sleeve
20. Tie rod
21. Actuator
22. Axle arms
23. Chassis machinery hitch
24. Angle rods
25. Chassis gussets
26. Three-point hitch
27. Hitch sleeve
28. Hitch-lock pin
29. Ball hitch
30. Eye hitch
31. Hitch plate
32. Hitch jack
33. Plural-rod chassis
34. Tractor truck
35. High-rod chassis
36. Low-rod chassis
37. Finger-wheel rakes
38. Van
39. Hydraulic-cylinder motor
40. Piston
41. Electric motor
42. Pinion gearing
43. Rack teeth
44. Helical gearing
45. Helical-screw teeth
46. Fifth-wheel hookup
47. Hydraulic controllers
48. Vehicle hydraulic system
49. Independent hydraulic system
50. Hydraulic pressure lines
51. Electric controllers
52. Vehicle electrical system
53. Independent electric system
54. Electric lines Referring first to FIG. 1, a steerable machinery trailer 1 with a chassis such as a single-rod chassis 2 has a pivotal towing attachment proximate a front portion of the chassis and has trailer wheels 3 with a steering-pivotal attachment to a rear portion of the chassis. A steering shaft 4 is extension-length controllable intermediate a first chassis position 5 and a steering arm 6 that is attached to a steering rod 7 that has steering-pivotal attached to axles on which the trailer wheels 3 rotate. A positioning shaft 8 is extension-length controllable intermediate a second chassis position 9 and a positioning arm 10 that is extended laterally from a tow pin 11 that is attachable non-rotatably to a towing vehicle such as a tractor 12. The front portion of the chassis such as the single-rod chassis 2 is attached rigidly to a tow sleeve 13 that pivots on the tow pin 11.

Figure 1:
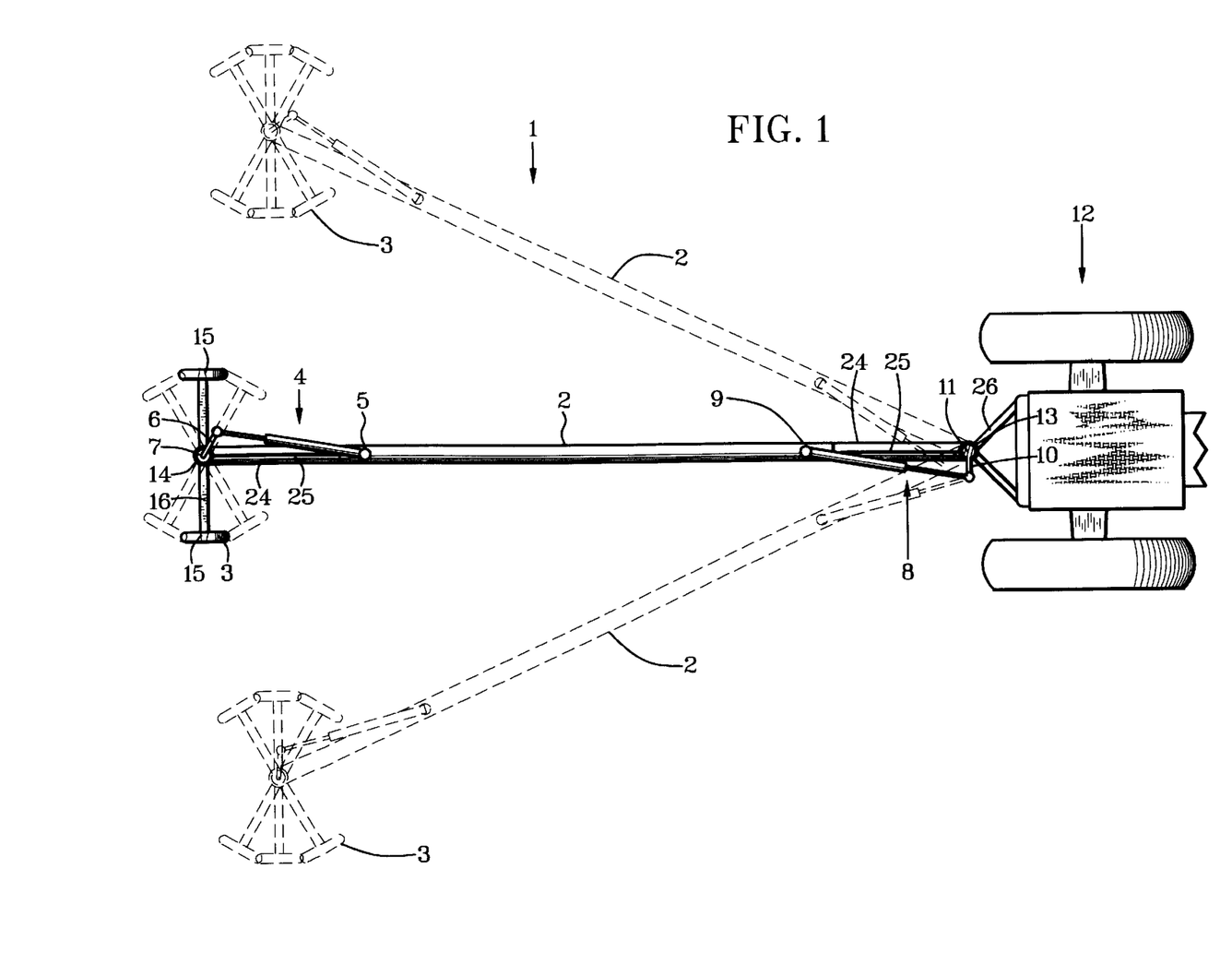
FIG. 1 is a top view of a steerable machinery trailer with a single-rod chassis hooked to an agricultural tractor with a three-point hitch and having trailer wheels on rigid-axle extensions from a pivotal axle for steering-pivotal attachment to the chassis.

Extension-length control of the steering shaft 4 and the positioning shaft 8 have contrasting effects because the steering rod 7 is rotatable in a steering sleeve 14 and the tow pin 11 is non-rotatable in the tow sleeve 13. Extension-length control of the steering shaft 4 pivots the steering rod 7 and the trailer wheels 3 while extension-length control of the positioning shaft 8 pivots the tow sleeve 13 and the chassis.

Figure 2:
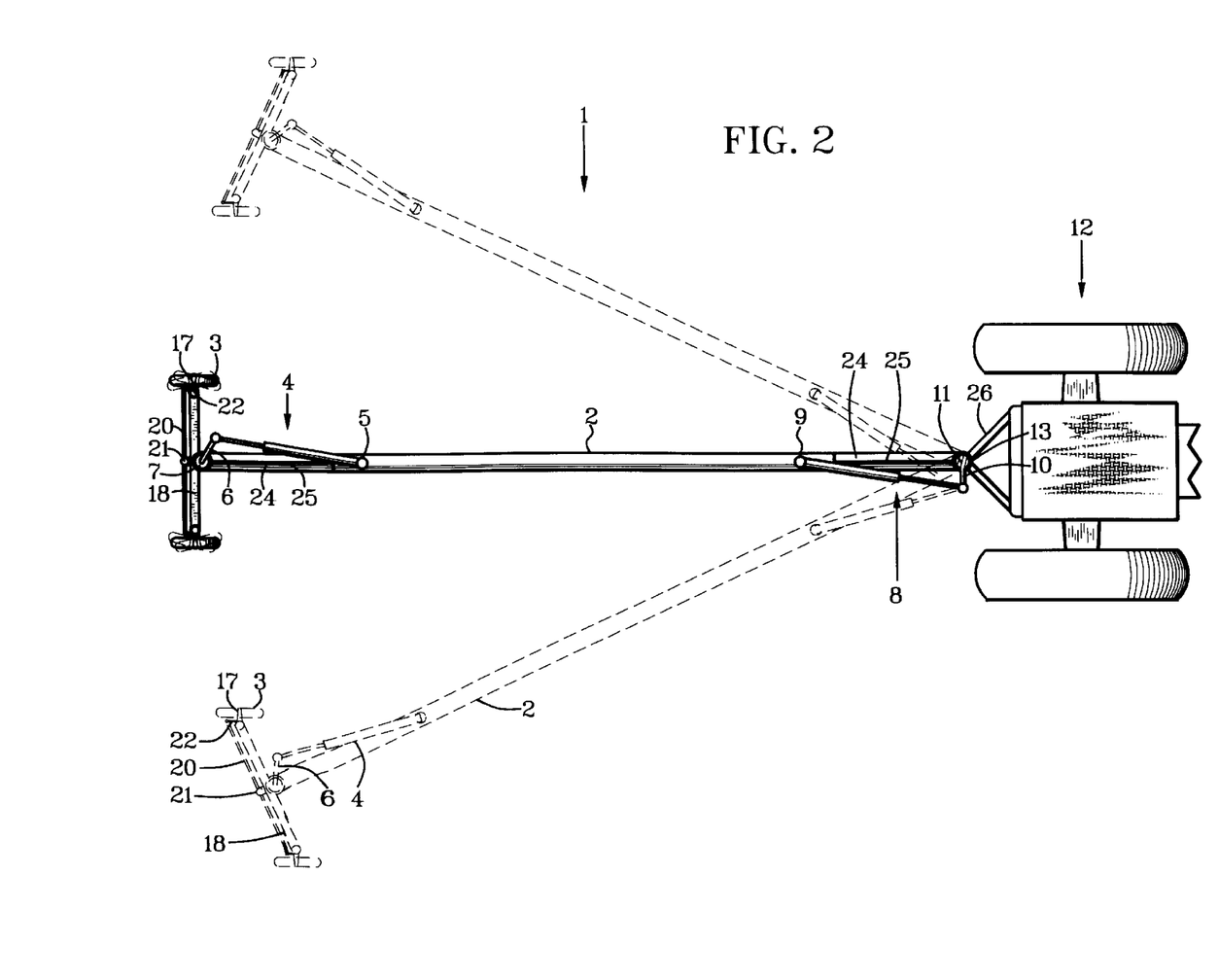
FIG. 2 is the FIG. 1 illustration having trailer wheels on pivot-axle extensions from a rigid axle beam for steering-pivotal attachment to the chassis.
Figure 26:
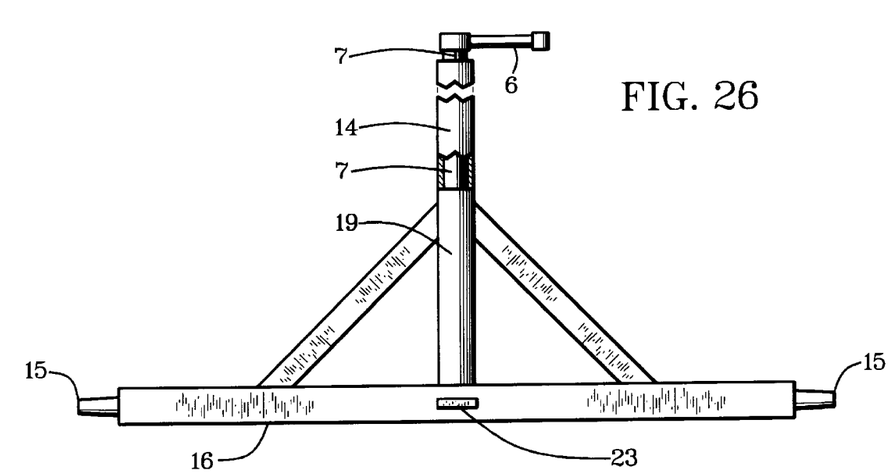
FIG. 26 is a partially cutaway side view of an axle section of a single-rod chassis having axles that are rigid extensions from a pivotal axle beam.
Figure 27:
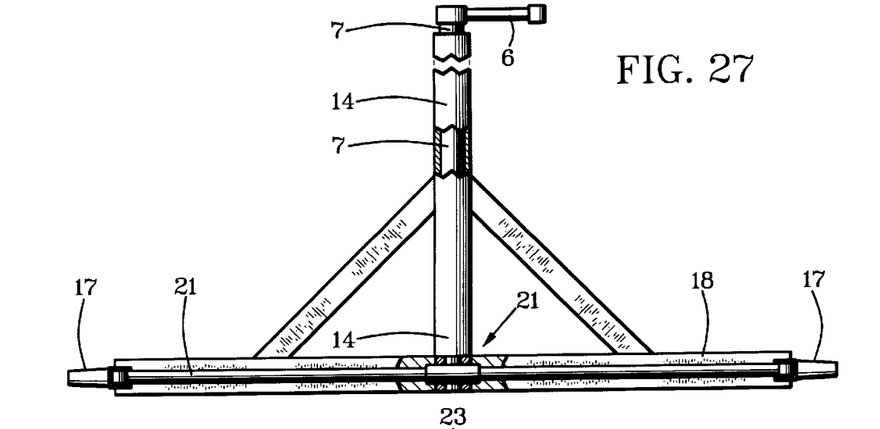
FIG. 27 is a partially cutaway side view of an axle section of a single-rod chassis having axles that are pivotal extensions from a rigid axle beam.
Figure 28:
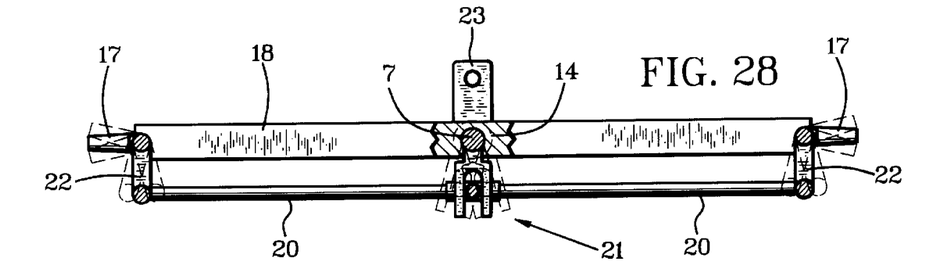
FIG. 28 is a partially cutaway bottom view of the FIG. 27 illustration.

Referring to FIGS. 1–2 and 26–28, the steering rod 7 has steering-pivotal attachment to trailer-wheel axles that can be either rigid-axle extensions 15 from opposite ends of a pivotal axle beam 16 as depicted in FIGS. 1 and 26 or pivotal-axle extensions 17 from opposite ends of a rigid axle beam 18 as depicted in FIGS. 2 and 27–28. The steering rod 7 pivots in the steering sleeve 14 in response to pivotal travel of the steering arm 6 from length changes of the steering shaft 4.

The steering sleeve 14 extends downward to an axle sleeve 19 for turning the pivotal axle beam 16. The steering sleeve 14 extends to the rigid axle beam 18 for turning the pivotal-axle extensions 17 with a tie rod 20 that is actuated by an actuator 21 extended between a bottom end of the steering rod 7 and a suitable connection of the actuator 21 to the tie rod 20 in accordance with known steering technology. The actuator 21 with a bifurcated connection as depicted in FIGS. 27–28 also can be used. The tie rod 20 is attached pivotally to axle arms 22 that are attached to the pivotal-axle extensions 17.

A chassis machinery hitch 23 is positioned on an aft side of the pivotal axle beam 15 and on the aft side of the rigid axle beam 17 for applications that require towing additional machinery.

Referring to FIGS. 1–2 and 20–25, a single-rod chassis 2 can have angle rods 24 and chassis gussets 25 with which it is attached to the tow sleeve 13 which pivots on the tow pin 11. At a top of the tow pin 11, the positioning arm 10 is attached rigidly for pivotal positioning of the single-rod chassis 2 with length-changing of the positioning shaft 8 in opposition to non-rotational rigidity of the tow pin 11.

Figure 20:
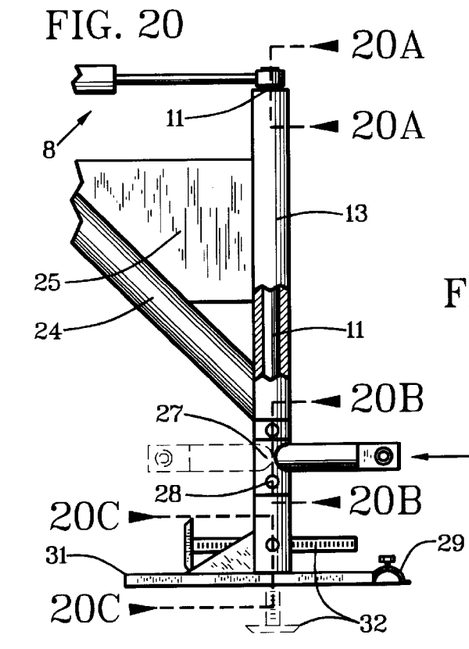
FIG. 20 is a partially cutaway side elevation view of a hitch portion of a single-rod chassis of a steerable machinery trailer having a pivotal three-point hitch and a ball hitch.
Figure 21:
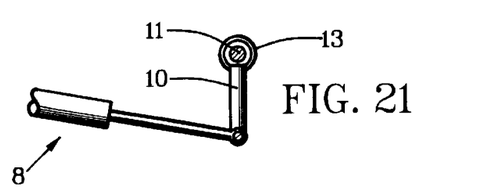
FIG. 21 is a top view of a positioning-arm portion of a single-rod chassis taken through section line 20A—20A of FIG. 20.
Figure 22:
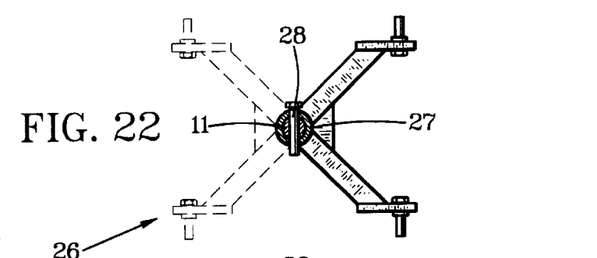
FIG. 22 is a top view of a three-point-hitch portion of a single-rod chassis taken through section line 20B—20B of FIG. 20.

Non-rotational rigidity of the tow pin 11 is provided by non-rotational attachment of the tow pin 11 to a towing vehicle such as a tractor 12. Non-rotational attachment to the towing vehicle is accomplished with a three-point hitch 26 or an equivalently rigid attachment. Preferably, the three-point hitch 26 or its equivalent has a hitch sleeve 27 with which it is rotatable between a use position forward and a non-use position rearward as depicted in FIGS. 20 and 22. A non-use position rearward is indicated by dashed lines. The three-point hitch 26 can be locked in use or non-use positions by a locking means such as a hitch-lock pin 28 that extends through the hitch sleeve 27 and the tow pin 11.

The purpose of rotation of the three-point hitch 26 or its equivalent is for applications of this steerable machinery trailer 1 requiring towing by vehicles not having three-point-hitch capability or for uses not requiring side-positioning when only the steering features will be used. Rotation of the three-point hitch 26 or its equivalent to a rearward non-use position prevents its obstructive contact with different towing vehicles.

Figure 23:
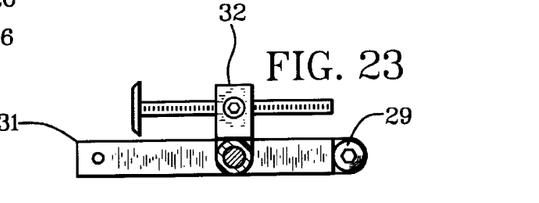
FIG. 23 is a top view of a ball-hitch portion of a single-rod chassis taken through section line 20C—20C of FIG. 20.
Figure 24:
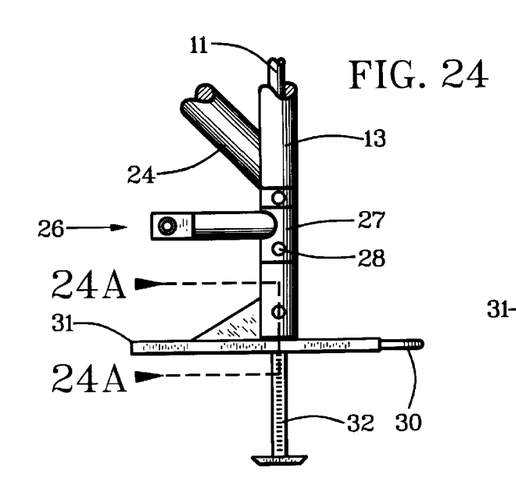
FIG. 24 is a partially cutaway side elevation view of a hitch portion of a single-rod chassis of a steerable machinery trailer having a pivotal three-point hitch and an eye hitch.
Figure 25:
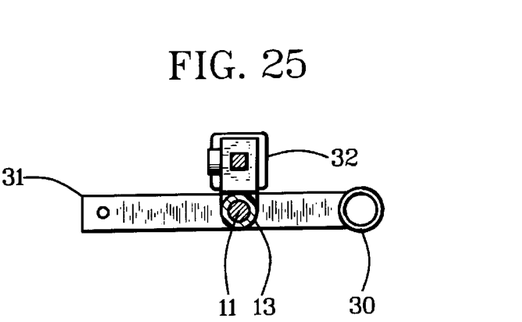
FIG. 25 is a top view of an eye-hitch portion of a single-rod chassis taken through section line 24A—24A of FIG. 24.

Towing of the single-rod chassis 2 by vehicles without rotationally rigid attachment is accomplished preferably with either a ball hitch 29 as depicted in FIGS. 20 and 23 or an eye hitch 30 on forward portions of hitch plates 31 at a bottom of a tow pin 11 and a tow sleeve 13 as depicted in FIGS. 24–25. The hitch plate 31 is affixed rigidly to the tow pin 11.

Preferably a hitch jack 32 is attached pivotally proximate the hitch plate 31 as depicted in FIGS. 20, 23 and 24–25 to position the three-point hitch 26, the ball hitch 29 and the eye hitch 30 vertically for their attachment to select types of towing vehicles employed. The hitch jack 32 is rotatable between a horizontal non-use position depicted in FIGS. 20 and 23 and a use position depicted in FIGS. 24–25. The hitch jack 32 can be sized, shaped and positioned for noninterference with towing vehicles or with vehicles being towed.

Figure 3:
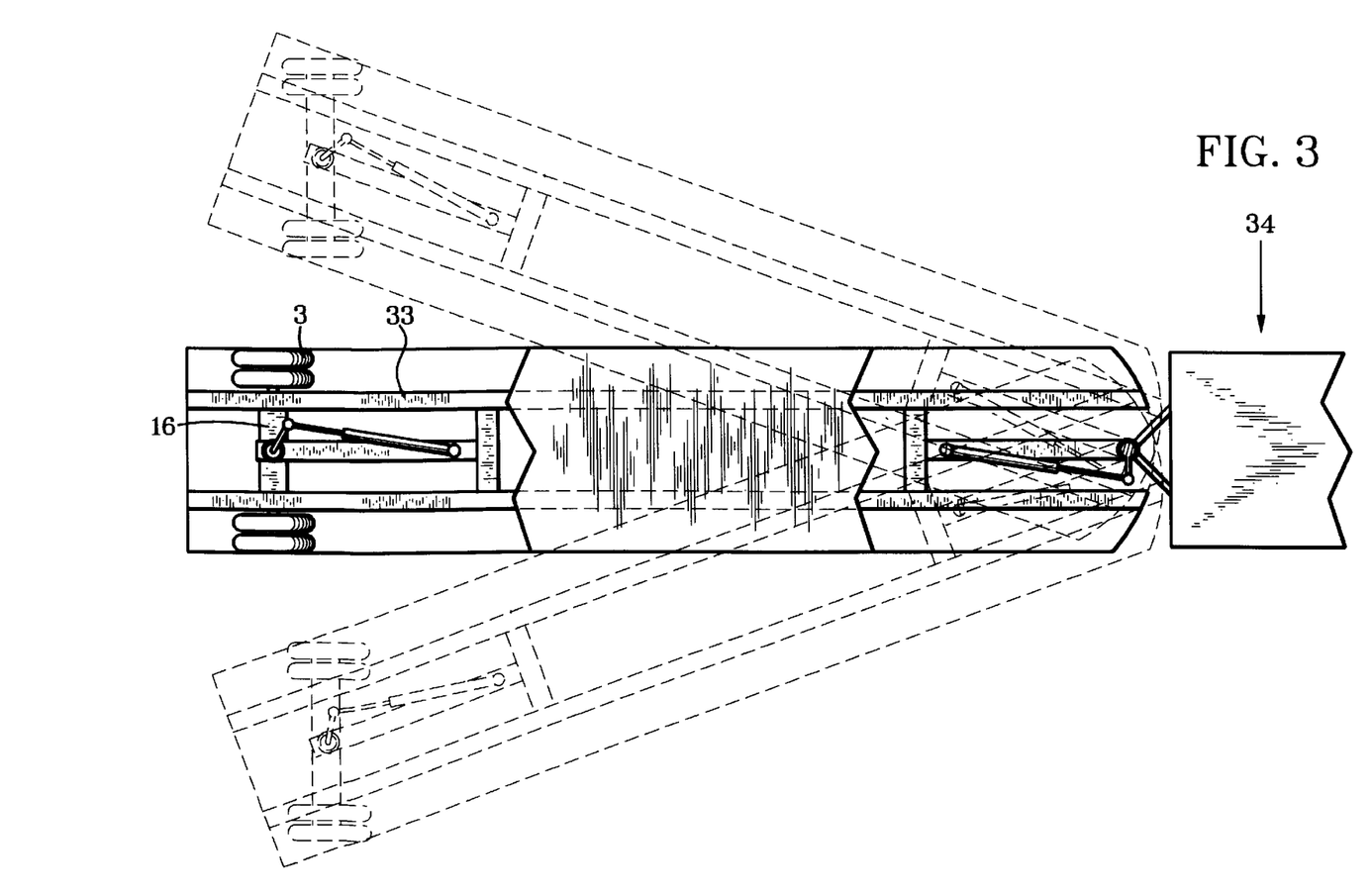
FIG. 3 is a partially cutaway top view of a steerable machinery trailer such as a semitrailer with a plural-rod chassis hooked to a road tractor and having trailer wheels on rigid-axle extensions from a pivotal axle for steering-pivotal attachment to the chassis.
Figure 4:
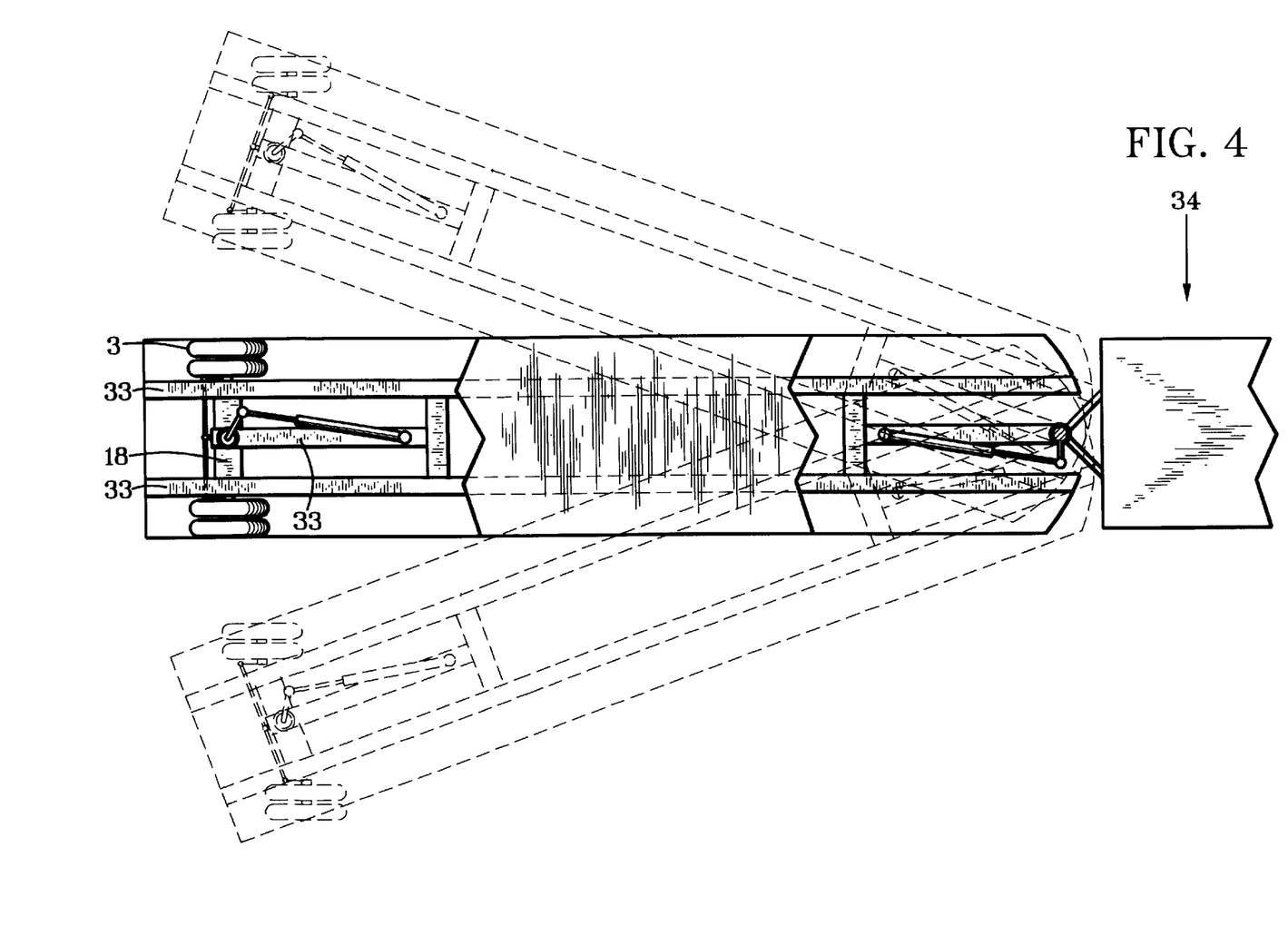
FIG. 4 is the FIG. 3 illustration having trailer wheels on pivot-axle extensions from a rigid axle beam for steering-pivotal attachment to the chassis.

Referring to FIGS. 1–4, the chassis can be a plural-rod chassis 33 as shown with either a pivotal axle beam 16 in FIG. 3 or a rigid axle beam 18 in FIG. 4. A towing vehicle can be either a tractor truck 34 or a tractor 12, described in relation to FIGS. 1–2, for either a plural-rod chassis 33 or a single-rod chassis 2 described in relation to FIGS. 1–2.

Figure 5:
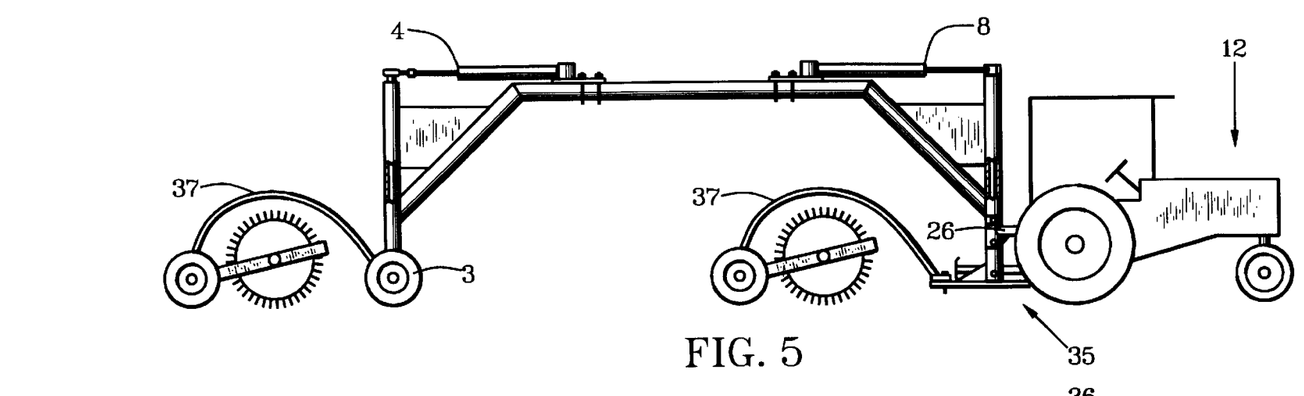
FIG. 5 is a partially cutaway side elevation view of the FIG. 1 illustration with machinery such as a first finger-wheel hay rake attached to the agricultural tractor and a second finger-wheel hay rake attached to a rear portion of the single-rod chassis for selective turning and position-towing of the rear portion of the chassis and machinery attached to it.
Figure 6:
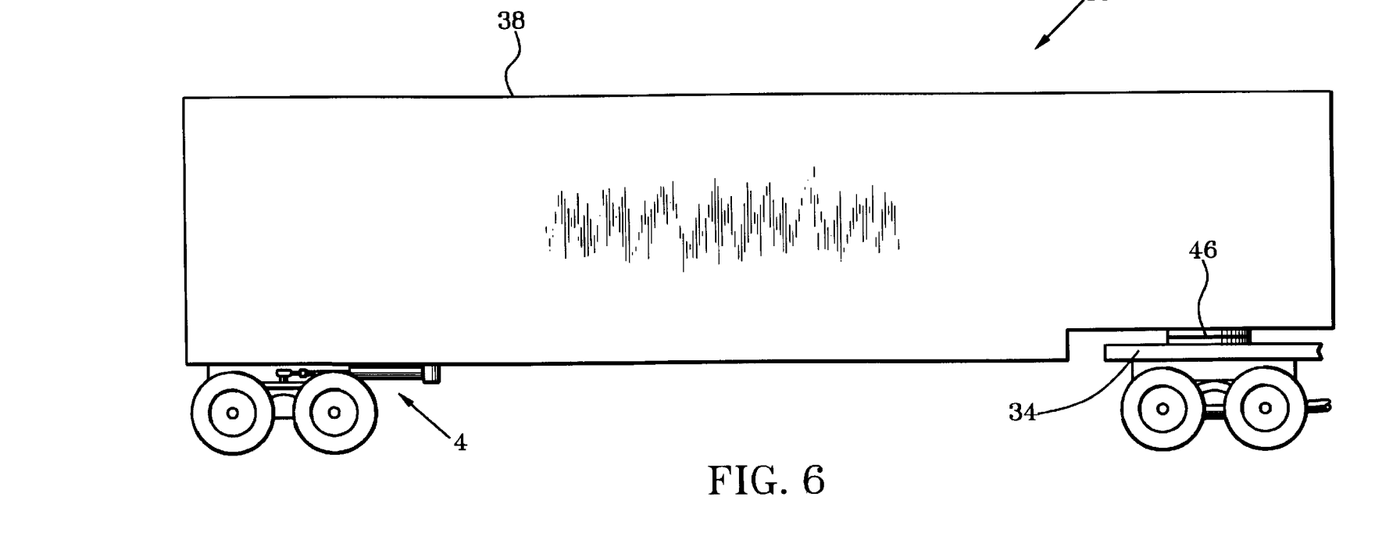
FIG. 6 is a side view of a semitrailer with a steering shaft positioned for controllable turning of tandem dual wheels.

Referring to FIGS. 1–6, the chassis can be either a high-rod chassis 35 as shown in FIGS. 1–2 and 5 or a low-rod chassis 36 as shown in FIGS. 3–4 and 6 regardless of whether one or a plurality of rods are used for its construction. A high-rod chassis 35 supports loads under rods and allows passage of machinery such as finger-wheel rakes 37 from-side-to-side laterally under it. A low-rod chassis 36 supports loads such as van 38 on it. A low-rod chassis 36 is more likely to have need for only a steering shaft 4 and related steering features, described in relation to FIGS. 1–2, for turn control, while a high-rod chassis 35 is likely to have need for a positioning shaft 8 and related features, described in relation to FIGS. 1–2, for side towing in addition to turn control.

Figure 7:
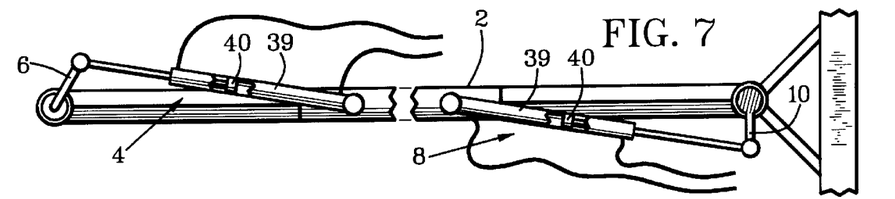
FIG. 7 is a partially cutaway top view of opposite ends of a single-rod chassis of a steerable machinery trailer having a steering shaft and a positioning shaft that are extension-length controllable with hydraulic-cylinder motors.

Referring to FIG. 7, the steering shaft 4 described in relation to FIGS. 1–2 can be a telescopic rod that is extension-length controllable with a hydraulic-cylinder motor 39 in which fluid is pressured selectively against a piston 40 intermediate a steering-arm 6 portion and a first chassis position 5. Similarly, the positioning shaft 8 described in relation to FIGS. 1–2 can be a telescopic rod that is extension-length controllable with a hydraulic-cylinder motor 39 in which fluid is pressured selectively against a piston 40 intermediate a positioning-arm 10 portion and a second chassis position 9.

Figures 8, 9:
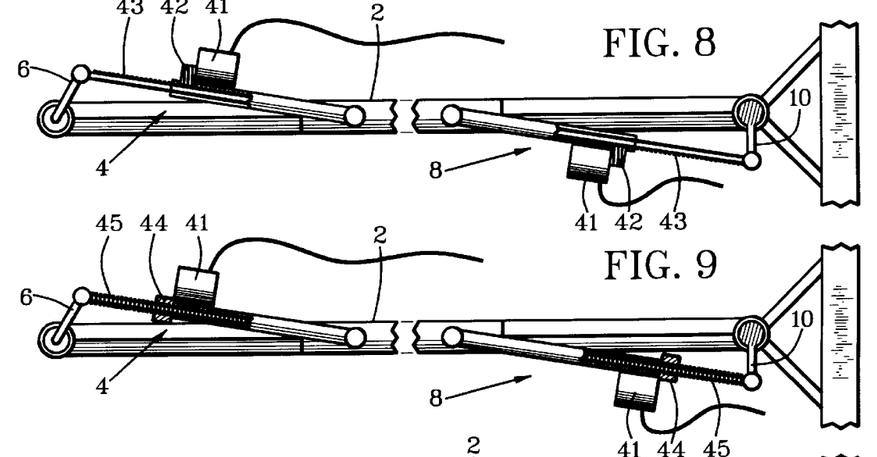
FIG. 8 is a partially cutaway top view of opposite ends of a single-rod chassis of a steerable machinery trailer having a steering shaft and a positioning shaft that are extension-length controllable with rack-and-pinion-geared electrical motors.
FIG. 9 is a partially cutaway top view of opposite ends of a single-rod chassis of a steerable machinery trailer having a steering shaft and a positioning shaft that are extension-length controllable with worm-geared electrical motors.

Referring to FIGS. 8–9, the steering shaft 4 and the positioning shaft 8 described in relation to FIGS. 1–2 can be telescopic rods that are extension-length controllable with an electric motor 41 that is rotated selectively in rotation of drive-gear teeth in gearing drive of extension-arm teeth on the telescopic rods. The drive-gear teeth can be pinion gearing 42 and the extension-arm teeth can be rack teeth 43 as depicted in FIG. 8. Optionally, the drive-gear teeth can be helical gearing 44 and the extension-arm teeth can be helical-screw teeth 45 as depicted in FIG. 9.

Figure 10:
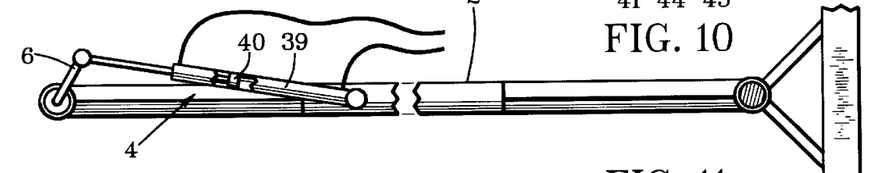
FIG. 10 is a partially cutaway top view of a single-rod chassis of a steerable machinery trailer having a steering shaft without a positioning shaft for controllable steering without side-tow positioning.
Figure 11:
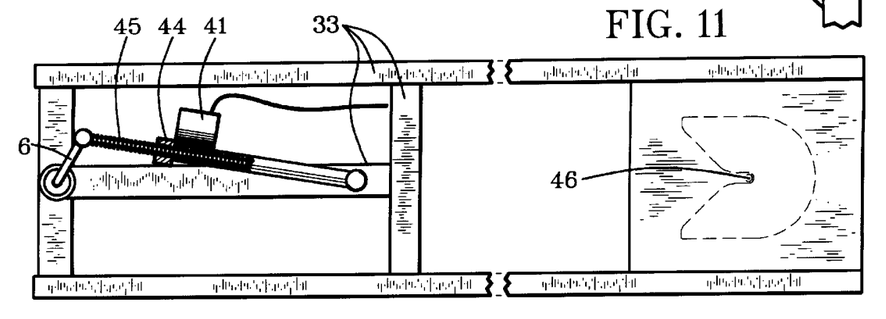
FIG. 11 is a partially cutaway top view of a plural-rod chassis of a steerable machinery trailer having a steering shaft without a positioning shaft for controllable steering without side-tow positioning.

Referring to FIGS. 10–11, a hydraulic-cylinder motor 39 is preferable for most single-rod chassis 2 for rapid but less accurate steering control. For more accurate steering control and for rapid control at greater cost, the electric motor 41, particularly a step motor for applications involving use of a fifth-wheel hookup 46 is preferable. Preferable for applications involving use of a fifth-wheel hookup 46 are ball screws with the helical gearing 44 and the helical-screw teeth 45 described in relation to FIG. 9.

Figure 12:
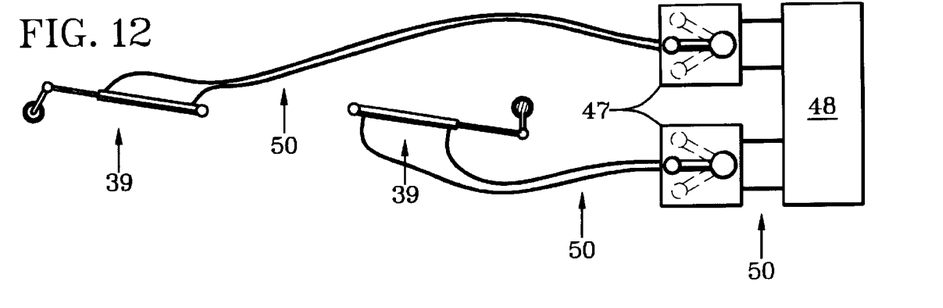
FIG. 12 is a schematic diagram of a remote hydraulic steering controller and a remote hydraulic positioning controller in fluid communication with a hydraulic system of a towing vehicle.
Figure 13:
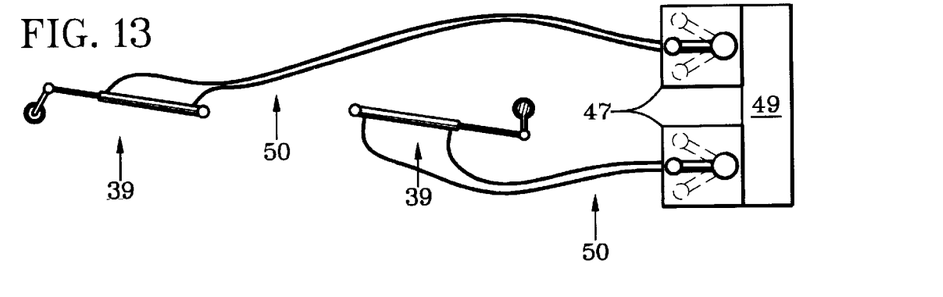
FIG. 13 is a schematic diagram of a remote hydraulic steering controller and a remote hydraulic positioning controller in fluid communication with an independent hydraulic system.
Figure 14:
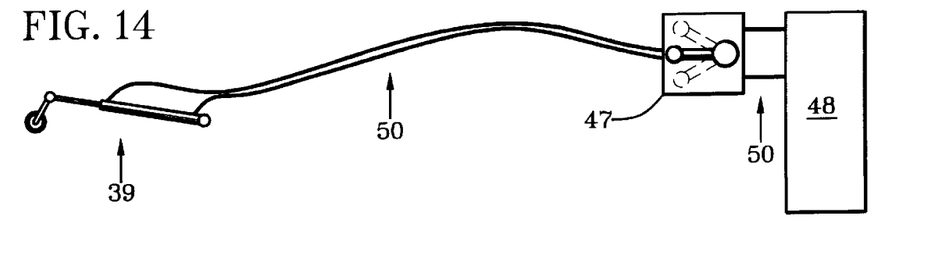
FIG. 14 is a schematic diagram of a remote hydraulic steering controller in fluid communication with a hydraulic system of a towing vehicle.
Figure 15:
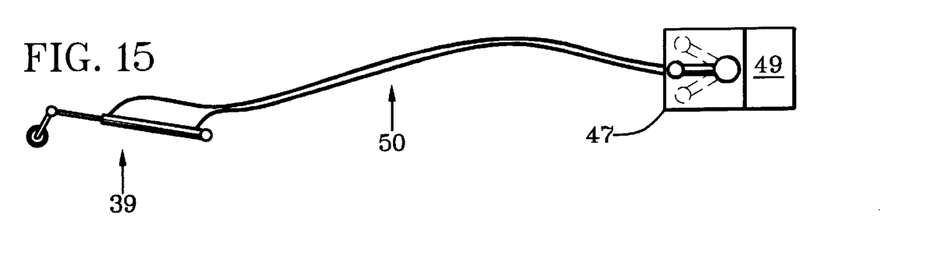
FIG. 15 is a schematic diagram of a remote hydraulic steering controller in fluid communication with an independent hydraulic system.

Referring to FIGS. 12–15, selectively pressurized hydraulic fluid can be supplied to hydraulic-cylinder motors 39 described in relation to FIG. 7 through hydraulic controllers 47 from a vehicle hydraulics system 48 as depicted in FIGS. 12 and 14 and/or from an independent hydraulics system 49 as depicted in FIGS. 13 and 15. Hydraulic pressure lines 50 convey the selectively pressurized hydraulic fluid accordingly.

Figure 16:
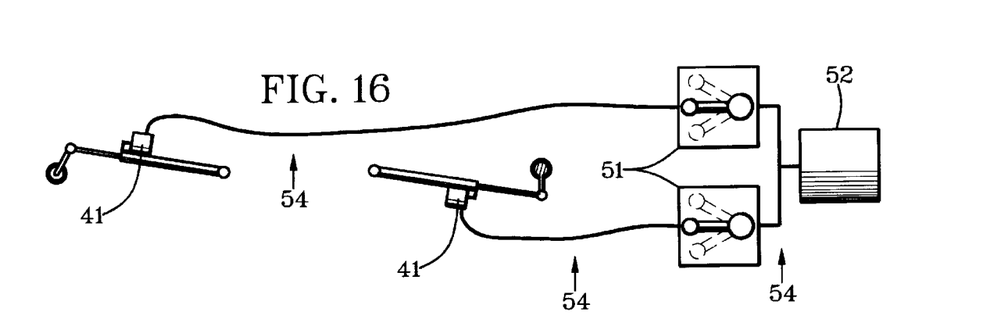
FIG. 16 is a schematic diagram of a remote electrical steering controller and a remote electrical positioning controller in electrical communication with an electrical system of a towing vehicle.
Figure 17:
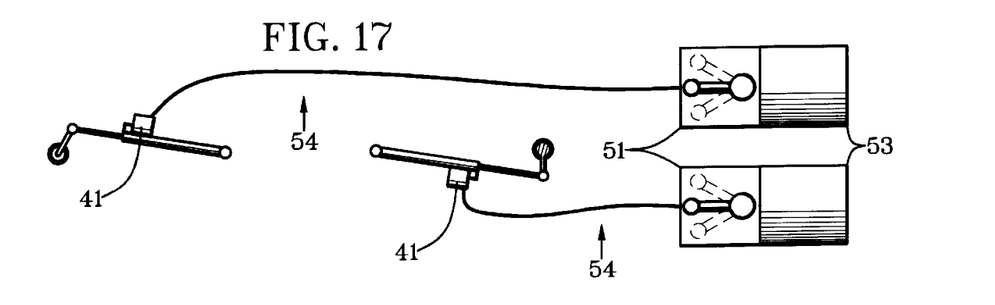
FIG. 17 is a schematic diagram of a remote electrical steering controller and a remote electrical positioning controller in electrical communication with an independent electrical system.
Figure 18:
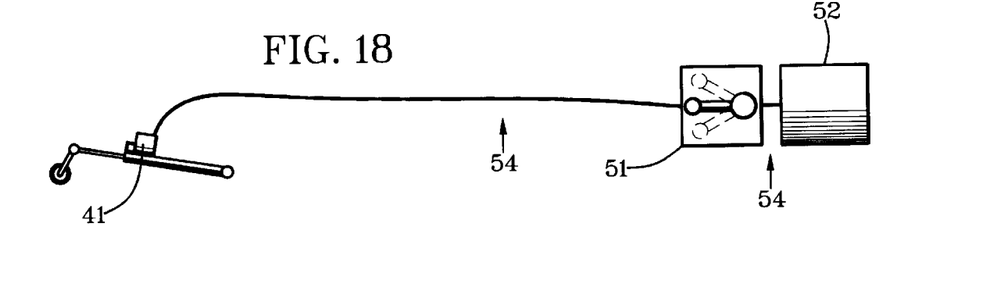
FIG. 18 is a schematic diagram of a remote electrical steering controller in electrical communication with an electrical system of a towing vehicle.
Figure 19:
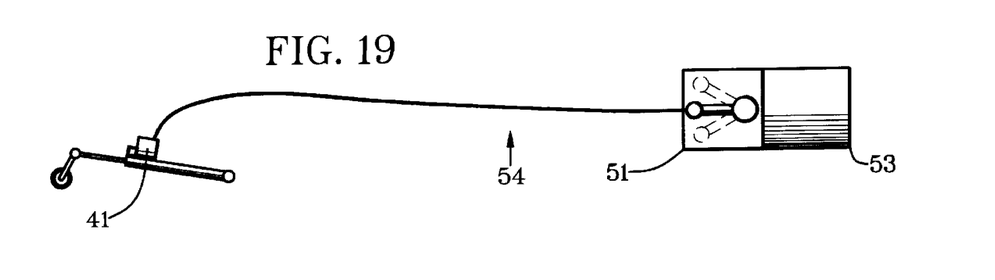
FIG. 19 is a schematic diagram of a remote electrical steering controller in fluid communication with an independent electrical system.

Referring to FIGS. 16–19, selectively controlled electrical current can be supplied to electric motors 41 described in relation to FIGS. 8–9 through electric controllers 51 from a vehicle electrical system 52 as depicted in FIGS. 16 and 18 and/or from an independent electric system 53 as depicted in FIGS. 17 and 19. Electric lines 54 convey the selectively controlled electric current accordingly.

A new and useful steerable machinery trailer having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A steerable machinery trailer comprising:
   a chassis having a pivotal towing attachment proximate a front portion of the chassis and having trailer wheels with steering-pivotal attachment to a rear portion of the chassis;

a steering shaft that is extension-length controllable intermediate a first chassis position and a steering arm that is attached to a steering rod that has steering-pivotal attachment to axles on which the trailer wheels rotate;

a positioning shaft that is extension-length controllable intermediate a second chassis position and a positioning arm that is extended laterally from a tow pin that is attachable non-rotatably to a towing vehicle;

a tow sleeve that pivots on the tow pin;

the front portion of the chassis being attached rigidly to the tow sleeve;

a steering controller positioned proximate the steering shaft and having remote control of extension length of the steering shaft; and a positioning controller positioned proximate the positioning shaft and having remote control of extension length of the positioning shaft.

2. A steerable machinery trailer as described in claim 1 wherein:

the steering shaft is a telescopic rod having a steering-arm portion that is attached pivotally to the steering arm and a chassis portion that is attached pivotally to the first chassis position.

3. A steerable machinery trailer as described in claim 2 wherein:

the telescopic rod is extension-length controllable hydraulically with fluid in a hydraulic-cylinder motor being pressured selectively against a piston intermediate the steering-arm portion and the chassis portion of the steering shaft;

an extension portion of the hydraulic-cylinder motor is attached to the steering-arm portion of the steering shaft;

a base portion of the hydraulic-cylinder motor is attached to the chassis portion of the steering shaft; and the fluid in the hydraulic-cylinder motor is pressurized selectively with a remote fluid pressurizer.

4. A steerable machinery trailer as described in claim 3 wherein:

the remote fluid pressurizer is a remote steering controller with a hydraulic-pressurization system in fluid communication with the hydraulic-cylinder motor.

5. A steerable machinery trailer as described in claim 3 wherein:

the remote hydraulic-pressurization system is a hydraulic system of a towing vehicle.

6. A steerable machinery trailer as described in claim 2 wherein:

the telescopic rod is extension-length controllable electrically by an electric motor that is rotated selectively in rotation of drive-gear teeth in gearing drive of steering-arm teeth on the telescopic rod;

the steering-arm teeth are on an extension portion of the telescopic rod that is attached to the steering-arm portion of the steering shaft;

the electric motor and drive-gear teeth are on a base portion of the telescopic rod that is attached to the chassis portion of the steering shaft; and current is provided to the electric motor selectively with a remote current source.

7. A steerable machinery trailer as described in claim 6 wherein:

the remote current source is a remote steering controller with electrical current in electrical communication with the electric motor.

8. A steerable machinery trailer as described in claim 6 wherein:

the remote current source is an electrical system of a towing vehicle.

9. A steerable machinery trailer as described in claim 1 wherein:

the chassis has at least one low structural rod to which the trailer wheels have steering-pivotal attachment, such that loads can be supported by the low structural rod and machinery can be attached selectively to a rear portion of the chassis and to portions of the chassis intermediate the trailer wheels and the pivotal attachment.

10. A steerable machinery trailer as described in claim 1 wherein:

the chassis has at least one high structural rod to which the trailer wheels have steering-pivotal attachment, such that the high structural rod overpasses loads suspended selectively from the high structural rod and overpasses machinery that passes selectively under the high structural rod and also such that machinery can be attached selectively to a rear portion of the chassis.

11. A steerable machinery trailer as described in claim 10 wherein:

machinery that passes selectively under the high structural rod includes a front hay rake and machinery that can be attached selectively to the rear portion of the chassis includes a rear hay rake.

12. A steerable machinery trailer as described in claim 1 wherein:

the axles on which the trailer wheels rotate are rigid-axle extensions from opposite ends of a pivotal axle beam to which a bottom end of the steering rod is attached rigidly;

the steering rod is rotatable in a steering sleeve that is affixed vertically to the rear portion of the chassis; and steering-pivotal attachment of the trailer wheels to the rear portion of the chassis is with the steering rod which is pivotal orthogonally to the chassis by the steering arm which is attached pivotally to the steering shaft.

13. A steerable machinery trailer as described in claim 1 wherein:

the axles on which the trailer wheels rotate are pivotal-axle extensions from opposite ends of a rigid axle beam that is attached to the rear portion of the chassis;

the steering rod is rotatable in a steering sleeve that is affixed vertically to the rear portion of the chassis;

a tie rod is attached pivotally to and extended intermediate the pivotal-axle extensions;

the steering rod has a bottom end with a tie-rod actuator in contact with the tie rod; and steering-pivotal attachment of the trailer wheels to the rear portion of the chassis is with the rigid axle beam which has the pivotal-axle extensions which are pivoted uniformly by the tie rod that is actuated from-side-to-side by the steering-rod actuator which is attached to the steering rod which is pivotal orthogonally to the chassis by the steering arm which is attached pivotally to the steering shaft.

14. A steerable machinery trailer as described in claim 1 wherein:

the positioning shaft is a telescopic rod having a positioning-arm portion that is attached pivotally to the positioning arm and a chassis portion that is attached pivotally to the second chassis position.

15. A steerable machinery trailer as described in claim 14 wherein:
   the telescopic rod is extension-length controllable hydraulically with fluid in a hydraulic-cylinder motor being pressured selectively against a piston intermediate the positioning-arm portion and the chassis portion of the positioning shaft;
   an extension portion of the hydraulic-cylinder motor is attached to the positioning-arm portion of the positioning shaft;
   a base portion of the hydraulic-cylinder motor is attached to the chassis portion of the positioning shaft; and
   the fluid in the hydraulic-cylinder motor is pressurized selectively with a remote fluid pressurizer.

16. A steerable machinery trailer as described in claim 15 wherein:
   the remote fluid pressurizer is a remote positioning controller with a hydraulic-pressurization system in fluid communication with the hydraulic-cylinder motor.

17. A steerable machinery trailer as described in claim 15 wherein:
   the remote hydraulic-pressurization system is a hydraulic system of a towing vehicle.

18. A steerable machinery trailer as described in claim 14 wherein:
   the telescopic rod is extension-length controllable electrically by an electric motor that is rotated selectively in rotation of drive-gear teeth in gearing drive of positioning-arm teeth on the telescopic rod;
   the positioning-arm teeth are on an extension portion of the telescopic rod that is attached to the positioning-arm portion of the steering shaft;
   the electric motor and drive-gear teeth are on a base portion of the telescopic rod that is attached to the chassis portion of the positioning shaft; and
   current is provided to the electric motor selectively with a remote current source.

19. A steerable machinery trailer as described in claim 18 wherein:
   the remote current source is a remote positioning controller with electrical current in electrical communication with the electric motor.

20. A steerable machinery trailer as described in claim 18 wherein:
   the remote current source is an electrical system of a towing vehicle.

21. A steerable machinery trailer as described in claim 1 wherein:
   the tow sleeve is attachable to the towing vehicle with a three-point hitch.

22. A steerable machinery trailer as described in claim 21 wherein:
   a hitch axle is extended vertically from the tow sleeve; and
   the three-point hitch has a hitch sleeve that is rotatable intermediate a fixable hitch-use position and a fixable hitch-non-use position on the hitch axle.

23. A steerable machinery trailer as described in claim 22 wherein:
   a pivotal-hitch rod having a pivotal hitch such as a ball-hitch socket, eye-hitch eye or a fifth-wheel plate is extended orthogonally forward from a pivotal-hitch extension of the tow sleeve.

24. A steerable machinery trailer as described in claim 23 and further comprising:
   a hitch jack that is pivotal between a jack-use vertical orientation and a jack-non-use horizontal orientation on a jack-attachment extension of the tow sleeve.

* * * * *